US008827139B2

(12) United States Patent
Obaditch et al.

(10) Patent No.: US 8,827,139 B2
(45) Date of Patent: Sep. 9, 2014

(54) FRICTION STIR WELDING USING A SACRIFICIAL ANVIL

(71) Applicant: Fluor Corporation, Aliso Viejo, CA (US)

(72) Inventors: Christopher J. Obaditch, Corona del Mar, CA (US); Glenn Grant, Benton City, WA (US); Charles Freman, Richland, WA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 0 days.

(21) Appl. No.: 13/968,230

(22) Filed: Aug. 15, 2013

(65) Prior Publication Data

US 2014/0138424 A1    May 22, 2014

Related U.S. Application Data

(62) Division of application No. 13/683,126, filed on Nov. 21, 2012.

(51) Int. Cl.
*B23K 20/12* (2006.01)

(52) U.S. Cl.
CPC .................................. *B23K 20/1245* (2013.01)
USPC .......................................................... 228/2.1

(58) Field of Classification Search
None
See application file for complete search history.

(56) References Cited

U.S. PATENT DOCUMENTS

| 5,493,097 | A | 2/1996 | Gustafsson et al. |
| 5,769,306 | A | 6/1998 | Colligan |
| 5,975,406 | A | 11/1999 | Mahoney et al. |
| 6,360,937 | B1 | 3/2002 | De Koning |
| 6,607,119 | B2 | 8/2003 | Engelhard et al. |
| 7,121,448 | B2 | 10/2006 | Subramanian et al. |
| 7,281,647 | B2 | 10/2007 | Stol et al. |
| 7,494,040 | B2 | 2/2009 | Babb et al. |
| 7,530,487 | B2 | 5/2009 | Kyriakoglou |
| 7,832,613 | B2 | 11/2010 | Hanlon et al. |
| 7,975,896 | B2 | 7/2011 | Maciel |
| 8,100,311 | B2 | 1/2012 | Ostersehlte |
| 8,220,694 | B2 | 7/2012 | Nakagawa et al. |
| 8,393,519 | B2 | 3/2013 | Allehaux et al. |
| 2005/0045694 | A1 | 3/2005 | Subramanian et al. |
| 2008/0096038 | A1 | 4/2008 | Nagano |

(Continued)

FOREIGN PATENT DOCUMENTS

| EP | 1796865 | 10/2005 |
| JP | 2007319931 | 12/2007 |
| WO | 2012/093680 | 7/2012 |

OTHER PUBLICATIONS

Patent Cooperation Treaty, "Notification of Transmittal of the International Search Report and the Written Opinion of the International Searching Authority, or the Declaration", PCT Application No. PCT/US12/66353, issued Aug. 14, 2013.

(Continued)

*Primary Examiner* — Kiley Stoner
*Assistant Examiner* — Carlos Gamino
(74) *Attorney, Agent, or Firm* — Fish & Tsang, LLP

(57) ABSTRACT

Devices and methods for friction stir welding using an anvil with a sacrificial material are disclosed. The method involves the steps of providing an anvil with a sacrificial material on the backside of the workpieces and operating a friction stir welding device to form a weld that joins the workpieces together with the sacrificial material. The anvil comprises a non-sacrificial base portion removably coupled with a sacrificial material.

7 Claims, 8 Drawing Sheets

(56) References Cited

U.S. PATENT DOCUMENTS

| | | |
|---|---|---|
| 2008/0099533 A1 | 5/2008 | Hanlon et al. |
| 2009/0200359 A1 | 8/2009 | Chen et al. |
| 2010/0084454 A1 | 4/2010 | Maciel |
| 2010/0252171 A1 | 10/2010 | Feng et al. |
| 2011/0076419 A1 | 3/2011 | Yang et al. |

OTHER PUBLICATIONS

Blodgett, O., "Blodgett's Basics: Good weld design is in the details", Jan. 1, 2009, http://weldingdesign.com/archive/blodgetts-basics-goodweld-design-details.

Mishra, R.S. et al., "Friction stir welding and processing", Materials Science and Engineering, 2005, vol. 50, pp. 1-78.

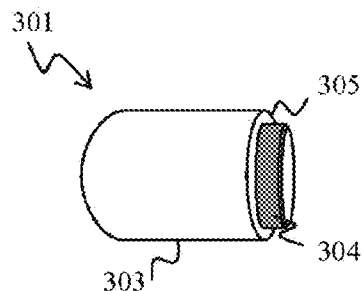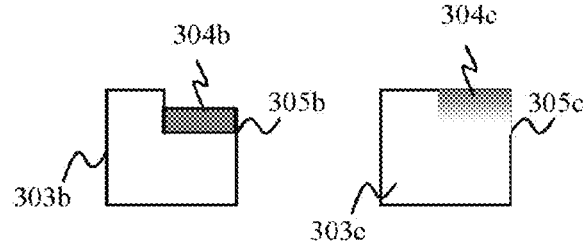
Figure 3A　　　　　Figure 3B　　　　　Figure 3C
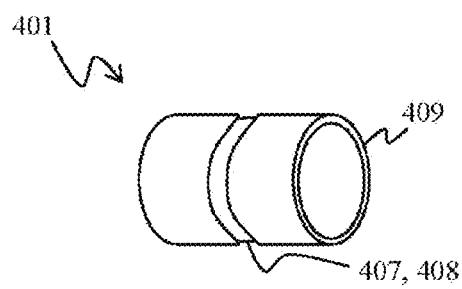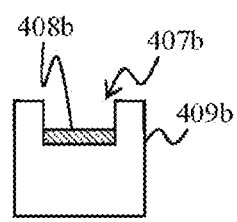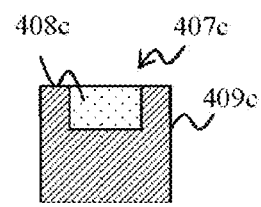
Figure 4A　　　　　Figure 4B　　　　　Figure 4C
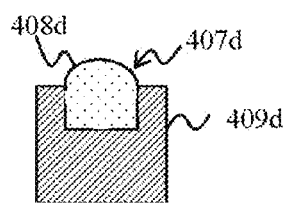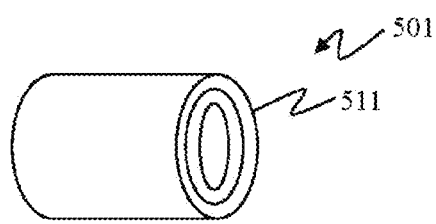
Figure 4D
Figure 5

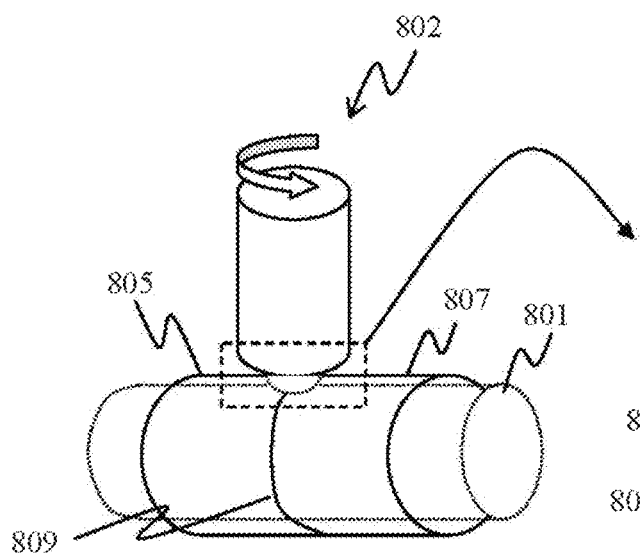 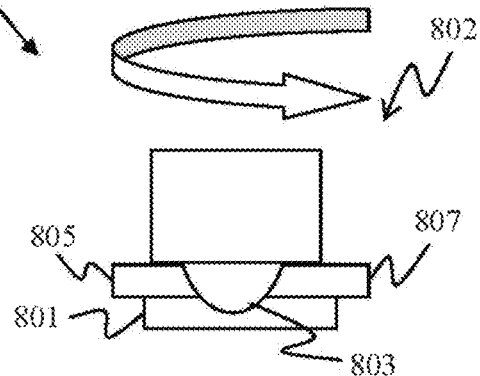
Figure 8A    Figure 8B
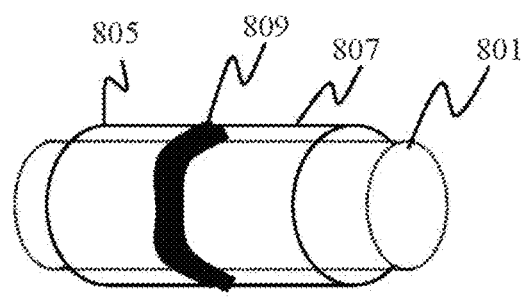
Figure 8C

FRICTION STIR WELDING USING A SACRIFICIAL ANVIL

This application is a divisional of U.S. patent application Ser. No. 13/683,126, filed Nov. 21, 2012. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is friction stir welding.

BACKGROUND

The background description includes information that may be useful in understanding the present invention. It is not an admission that any of the information provided herein is prior art or relevant to the presently claimed invention, or that any publication specifically or implicitly referenced is prior art.

Friction stir welding ("FSW") is a solid-state welding process in which a rotating tool heats and intermixes two workpieces at a seam. More specifically, the rotating tool has a pin that is pressed into the seam as the tool rotates, producing frictional heat between the tool and the workpieces. Enough heat is generated such that regions of the workpieces plasticize. A shoulder of the FSW tool assists in causing the plasticized regions to intermix, thus joining (i.e., friction stir welding) the workpieces at the seam. The rotating tool travels along the entire length of the seam to form a weld joint line between the two workpieces.

FSW provides numerous advantages over other welding processes, in part, due to the fact that FSW occurs at much lower temperatures and without a filler material. Some of the advantages of FSW include: better mechanical properties at the weld; less porosity, shrinkage, and distortion; little or no toxic fume emissions; no consumable filler material; and ease of automation. Since its conception in 1991, FSW has been heavily researched and successfully applied to numerous industries in a wide variety of applications.

For some FSW applications, the FSW tool must be maintained at an optimum penetration depth during the FSW process in order to achieve optimum weld quality. Under penetration (also referred to as lack of penetration or "LOP") can lead to non-welded portions along the seam, thus reducing the strength of the weld. Over penetration (e.g., penetrating beyond the optimum penetration depth) and full penetration (e.g., penetrating through the entire thickness of the workpieces) can also reduce the strength of the weld. Full penetration can even damage the FSW tool and the anvil that supports the backside of the workpieces. Variations in the thickness of the workpieces can make it difficult to maintain an optimal penetration depth during the FSW process.

In order to address the problems associated with full penetration, various references describe the use of a sacrificial material between the anvil and the workpieces. JP2007319931 to Jeong, for instance, describes a sacrificial metal foil that is inserted between the workpieces and the anvil. The disclosed foil can be steel, aluminum or copper, or a metal or ceramic sprayed coating. However, the foil runs the risk of failing to contain enough material to be effective when a friction stir welding pin deeply penetrates the members to be joined.

Of particular importance in the present application are FSW anvils that include a sacrificial material. As used herein, "sacrificial material" refers to a material that has material properties that have been chosen to allow the sacrificial material to form part of a FSW weldment without substantially degrading the quality of the weldment.

Sacrificial materials have been used in other aspects of FSW processes. For example, U.S. Pat. No. 6,607,119B2 to Engelhard describes a sacrificial element that is used to lead a friction pin out of a connection zone. U.S. Pat. No 8,220,694 to Nakagawa et al. teaches inserting a sacrificial material with a relatively low melting point between the workpieces to form part of the weld. However, those of ordinary skill in the art have failed to appreciate that sacrificial materials can be used in FSW anvils to address problems with full penetration.

Some references have opposed including materials other than the workpieces along a FSW weldment. For example, EP1796865 to Packer et al. describes coatings, such as TiN, TiCN, and others, that can be applied to an outer surface of an anvil (e.g., mandrel) to prevent diffusion welding between the mandrel shell and a pipe joint during FSW. (For a general description of a FSW process, see *Friction Stir Welding and Processing*, by R. S. Mishra et al, Materials Science and Engineering R 50 (2005) 1-78).

WO2012093680 to Chikuma et al. generally explains a process of friction stir welding a lid on a cylindrical pressure tank. The lid engages an opening of the tank to form a cylindrical butt joint on the outside of the tank. The lid also has a smaller diameter end portion that fits inside the tank. A FSW tool is used to form a weld along the butt joint. The FSW tool penetrates the butt joint at a depth that is sufficient to form a weld region between the smaller diameter end portion of the lid and the tank.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Thus, there is still a need for a sacrificial material that can reduce friction stir welding defects along a continuous seam between two workpieces and partially support the structure of the two workpieces.

SUMMARY OF THE INVENTION

The inventive subject matter provides apparatus, systems, and methods of friction stir welding two workpieces together using an anvil that has a sacrificial material. The method includes the step of providing a FSW machine with a rotatable pin (e.g., FSW tool) and juxtaposing the two workpieces to form a junction. The method also includes the step of positioning the anvil with the sacrificial material along the backside of the junction (e.g., the side that is opposite to the FSW tool) such that the sacrificial material overlies the junction, thus providing support to at least one of the workpieces during the FSW process. Once the workpieces and the anvil are in position, the FSW pin is rotated, inserted into the junction, and translated along the junction, creating a FSW weldment that joins the two workpieces and at least a portion of the sacrificial material. The method is terminated by removing the FSW pin from the weldment.

The inventive subject matter also provides a sacrificial anvil for joining two workpieces. The sacrificial anvil comprises a base portion having a channel and/or ridge, and a sacrificial material disposed in the channel and/or ridge. The composition of the base portion and the composition of the sacrificial material are different. In some embodiments the sacrificial material is separable from the base portion. The sacrificial material can be welded to the two workpieces using a FSW process.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 3A is a perspective view of one embodiment of an anvil with a ridge and a sacrificial material disposed in the ridge.

FIG. 3B is a close up view of the anvil of FIG. 3A.

FIG. 3C is a close up view of another embodiment of an anvil with a ridge and a sacrificial material disposed in the ridge.

FIG. 4A is a perspective view of one embodiment of an anvil with a channel and a sacrificial material disposed in the channel.

FIG. 4B is a close up view of the anvil of FIG. 4A.

FIG. 4C is a close up view of another embodiment of an anvil with a channel and a sacrificial material disposed in the channel.

FIG. 4D is a close up view of another embodiment of an anvil with a channel and a sacrificial material disposed in the channel.

FIG. 5 is a perspective view of one embodiment of a cylindrical anvil that has a non-sacrificial material layer and a sacrificial material layer.

FIGS. 8A and 8B are perspective and cross sectional views, respectively, of a seam being created by a friction stir welding tool and an anvil, wherein the pin penetrates the sacrificial material in the anvil.

FIG. 8C is a perspective view of a weld that joins two workpieces and a sacrificial material.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

One should appreciate that the disclosed techniques provide many advantageous technical effects including improved methods and devices for friction stir welding.

Figure 1:
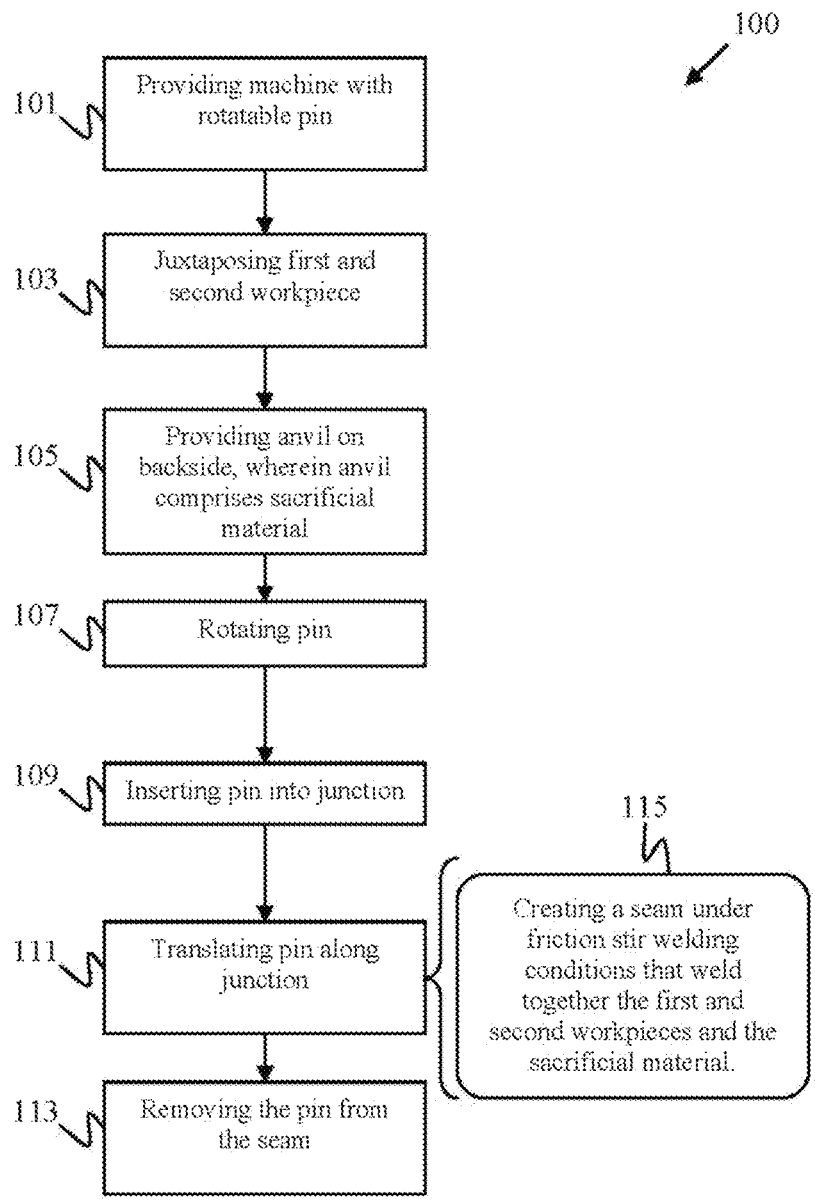
FIG. 1 is a method of friction stir welding two workpieces using an anvil with a sacrificial material.

FIG. 1 shows a flowchart of a method 100 for friction stir welding together two workpieces using an anvil with a sacrificial material. Step 101 is to provide a FSW machine with a rotatable pin. Step 103 involves juxtaposing the two workpieces to form a junction. Step 105 involves positioning an anvil on the backside of the junction. The anvil has a sacrificial material. In step 107, a FSW pin is rotated and in step 109, the pin is inserted into the junction. Step 111 involves translating the FSW pin along the junction to form a seam. The seam comprises a weld that joins the two workpieces and the sacrificial material of the anvil (step 115). Step 113 is to remove the FSW pin from the seam. Not all steps need to be performed in the exact order shown in FIG. 1.

Method 100 could additional include the step of removing some of the sacrificial material from the backside of the seam formed by step 111, for example, by using a cutting tool or a scarfing tool.

With respect to step 101, numerous configurations for FSW devices and tools are known in the art. Step 101 could comprise any FSW machine suitable for producing a weld under the conditions required by a user. In some configurations, the FSW pin is made of a metal alloy and is cylindrical or frustum-shaped. The shape, size, and composition of the pin will vary depending on the shape, size, composition, and other properties of the workpieces. In other aspects of some embodiments, the pin can be threaded and/or contain flutes.

With respect to step 103, the workpieces can be any configuration suitable for use with a FSW process. The workpieces can be flat, cylindrical, or even irregular shaped. The junction formed by juxtaposing the workpieces can be linear, curved, or even a tortuous and overlapping pathway. In some embodiments, the first and second workpieces are of similar shape and size. The junction could comprise a butt joint, lap joint, T butt joint, and/or a fillet joint. It is also contemplated that the first and second workpiece can have different compositions with respect to one another.

Figure 2A:
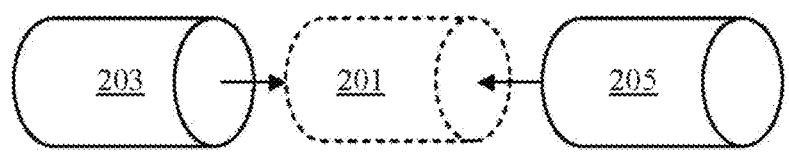
FIGS. 2A-2C are progressive views of two pipe segments being joined together to form a butt joint, and an anvil being positioned at the backside of the butt joint.
Figure 2B:
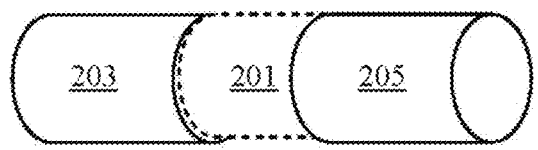
Figure 2C:
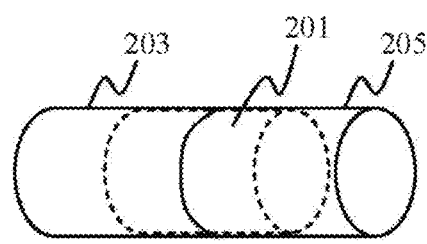

With respect to step 105, numerous embodiments of anvils having sacrificial material are possible. FIG. 2A shows a cylindrical anvil 201 positioned between a first pipe segment workpiece 203 and a second pipe segment workpiece 205. Steps 103 and 105 could be performed by sliding workpieces 203 and 205 together over anvil 201, as shown in FIG. 2B and 2C. Steps 103 and 105 could alternatively be formed by positioning workpieces 203 and 205 together, and then inserting anvil 201 into one of workpieces 203 and 205 and positing anvil 201 to the backside of the junction between workpieces 203 and 205 (e.g., with the use of a pipeline pig) such that the junction between the first and second workpieces 203 and 205 overlies the sacrificial material in anvil 201.

Anvil 201 can comprise of a variety of shapes and sizes. For example, the anvil could be a hollow or solid cylinder or a rectangle. In some embodiments, the anvil has a major non-perforated surface. In other aspects of some embodiments, the anvil's shape and size conforms to the contours of the backside of the junction of the first and second workpieces in a manner that provides support to the workpieces during the FSW process. Anvil 201 can comprise any composition of materials suitable for providing the structural support necessary to perform step 111 and 115. In some embodiments, the composition of anvil 201 is chosen such that the thermal conductivity and thermal capacitance of anvil 201 assists in maintaining a specific heating/cooling rate (e.g., a specific temperature-time profile, which may include constant and/or variable heating/cooling rates) of the workpieces and/or sacrificial material.

Anvil 201 has a sacrificial material. The sacrificial material is a material that can be welded by the friction stir welding process to form a portion of the weld. To facilitate this, the sacrificial material of anvil 201 can have a material property that is within a certain percent of the material property of at least one of the workpieces. For example, the sacrificial material of anvil 201 could have a hardness value that is within 10%, 5%, or even 2% of the hardness value of the first workpiece. Other material properties could include, but are not limited to, temperature of plasticity, coefficient of thermal expansion, fracture toughness, ductile yield strength, surface finish, reflectivity, thermal conductivity, and thermal capacity.

In one embodiment, a sacrificial material 304 can be disposed in a ridge 305 of an anvil 301, for example as illustrated in FIG. 3A. Anvil 301 comprises a base portion 303 that has a ridge 305. Base portion 303 has a chemical composition different from the sacrificial material 304 disposed in ridge 305. Base portion 303 is a non-sacrificial portion of anvil 301 and is not intended to be welded to the workpieces or penetrated by a FSW tool.

Ridge 305 can be of different heights and widths, as desired. In FIG. 3B, sacrificial material 304*b* only occupies a portion of the height of ridge 305*b*. In the alternative embodiment shown in FIG. 3C, sacrificial material 304*c* occupies the entire height and width of ridge 305*c*.

Sacrificial material 304*b* of FIG. 3B is different than the composition of base portion 303*b*, and there is a sudden compositional change at ridge 305*b*. In FIG. 3C, however, the composition of sacrificial material 304*c* varies gradually and there is no sudden compositional change at ridge 305*c*. In yet other embodiments, base portion 303 has the same composition as the sacrificial material 304.

Sacrificial material 304 can be coupled with base portion 303 via a bonding material, a mechanical coupling (e.g., screw fasteners), or any other coupling suitable for holding sacrificial material 304 to base portion 303. Base portion 303 and sacrificial material 304 can be manufactured separately and then bonded together to form anvil 301. However, it is contemplated that the anvil 301 could be manufactured as a single piece. For example, anvil 301 could be manufactured by blending a powder mixture, stacking the powder mixture in a container such that the stacked powder mixture includes a portion with a gradual change in composition, and applying a solid state densification process to produce a solid mass. The portion that has the gradual compositional change could be a channel portion or ridge portion of the solid mass and serves as the sacrificial material.

In yet other aspects, sacrificial material 304 can be separable from (i.e., removably coupled with) base portion 303. For example, sacrificial material 304 and base portion 303 could be coupled via a press fit, snap fit, male-female engagement, slotted engagement, weak adhesive bond, or any other removable coupling mechanism.

In another contemplated embodiment, the sacrificial material can be disposed in a channel of the anvil as shown in FIGS. 4A-C. Anvil 401 comprises a base portion 409 that has a channel 407. Disposed within channel 407 is a sacrificial material 408. Base portion 409 has a chemical composition different from sacrificial material 408. Nonetheless, it is contemplated that sacrificial material 408 could have a composition that is similar to the composition of base portion 409.

The amount of sacrificial material 408 within the channel 407 can vary. For example, the amount of sacrificial material 408*b* can partially fill channel 407*b*, as shown in FIG. 4B, or the sacrificial material 408*c* can completely fill channel 407*c*, as shown in FIG. 4C. Sacrificial material 408*d* can even overfill channel 407*d*, as shown in FIG. 4D. Overfilling the channel 407*d* allows the sacrificial material 408*d* to be pressed into the junction to be welded by a FSW process.

In further contemplated embodiments, the sacrificial material can be a separable outer layer 511 of the anvil 501 as shown in FIG. 5. In this embodiment, the composition of separable outer layer 511 can either be the same as, or different than, the composition of base portion 502. Moreover, the separable outer layer 511 can have a portion (e.g., channel or ridge) that is made of a sacrificial material, or can be made completely of a sacrificial material. Additionally, the separable outer layer 511 could be mechanically coupled or bonded to the base portion 502. For example, the separable outer layer 511 can include a bolt that couples the separable outer layer 511 and the base portion 502. When sacrificial material layer 511 is welded to two workpieces, the bolt could be removed so that the base portion 502 can be removed from the separable outer layer 511.

Figure 6A:
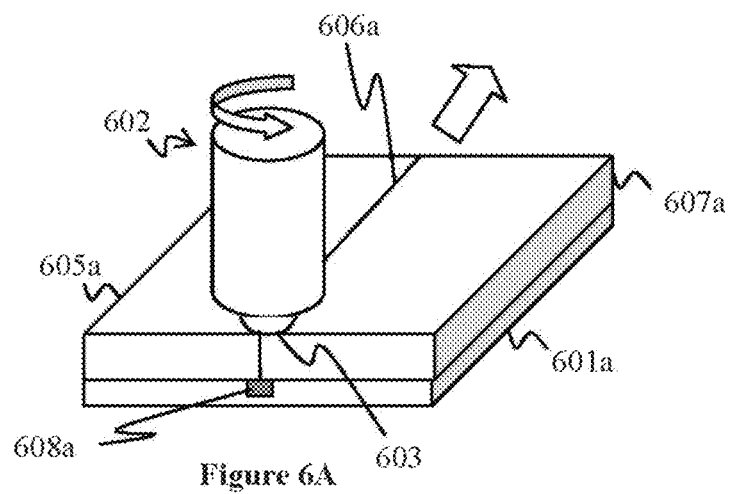
FIG. 6A is a perspective view of an exemplary configuration for friction stir welding two flat workpieces using a flat anvil.
Figure 6B:
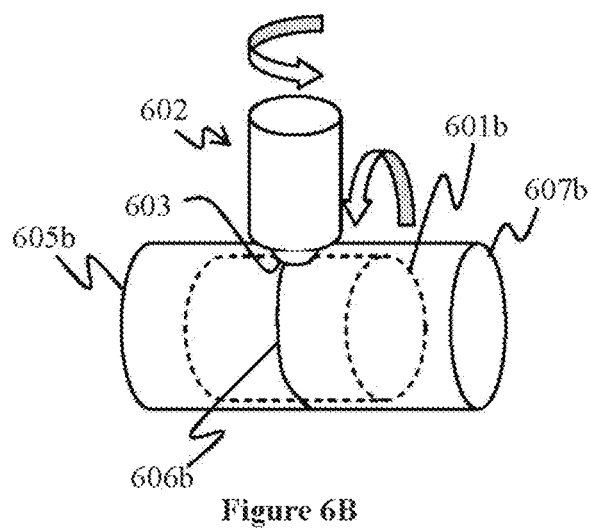
FIG. 6B is a perspective view of an exemplary configuration for friction stir welding two cylindrical workpieces using a cylindrical anvil.

In FIGS. 6A and 6B, an example is illustrated of steps 101-105 in FIG. 1. A FSW machine 602 with a rotatable pin 603 is provided along with a first workpiece 605 and a second workpiece 607. As discussed above, the workpieces can be a variety of shapes, including a flat rectangle workpiece, as shown in FIG. 6A, and a cylindrical workpiece, as shown in FIG. 6B. In addition, an anvil 601 comprising sacrificial material 608 is shown on the backside of a junction 606 along the first and second workpieces 605 and 607.

Figure 7A:
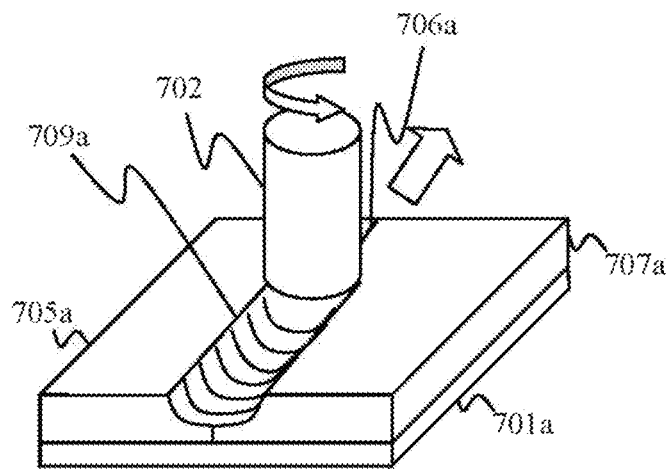
FIGS. 7A and 7B are perspective views of a seam being created by a friction stir welding tool and an anvil having sacrificial material.
Figure 7B:
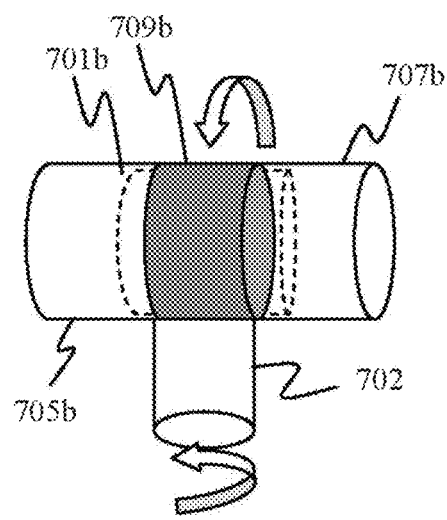

In contemplated embodiments a seam is created by friction stir welding as pin 603 is translated along the junction. An illustration of an example of steps 107-109 is shown in FIGS. 7A and 7B. As noted in FIGS. 7A and 7B, a machine with a rotatable pin 702 creates a seam 709, wherein pin 702 is rotated, inserted, and translated along a junction 706. The anvil 701 with the sacrificial material is positioned on the backside of the junction 706. Seam 709 is created along a junction 706 of the first and second workpieces 705 and 707. Seam 709 comprises a weld formed by material from first workpiece 705, second workpiece 707, and the sacrificial material of anvil 701.

In FIGS. 8A-C, an example is shown of a seam that comprises material from a first workpiece, a second workpiece, and sacrificial material of anvil. FIG. 8A illustrates a perspective view of a FSW machine with a rotatable pin 802 that is friction stir welding a first workpiece 805 and a second workpiece 807 at seam 809. Anvil 801 has sacrificial material that is placed on the backside of seam 809. FIG. 8B is a cross sectional view of the area of interest noted in FIG. 8A showing the rotatable pin 803 penetrating the first and second workpieces 805 and 807, and the sacrificial material of an anvil 801, to create a FSW weldment. FIG. 8C shows a perspective view of a seam 809 that is created as pin 803 is translated along the junction between the first and second workpieces 805 and 807. It is contemplated that the composition of seam 809 can vary with respect to percentage of the first and second workpieces 805 and 807, and the sacrificial material of anvil 801.

With respect to step 113 in method 100 of FIG. 1, it is contemplated that a variety of methods can be used to remove the pin. One method can comprise of simply pulling the pin out of the junction/seam. Another method can comprise positioning a ramp (e.g., wedge) on the workpieces and in front of the pin and running the pin up the ramp (and out of the seam).

Figure 9:
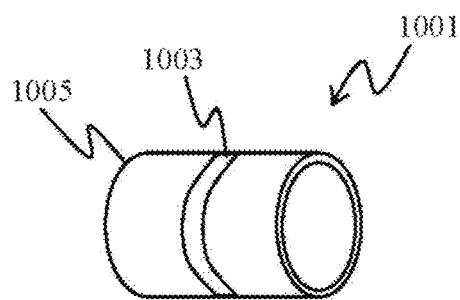
FIG. 9 is a perspective view of one embodiment of an anvil that has a base portion with a channel therein, and a sacrificial material disposed in the channel.

In FIG. 9, an exemplary embodiment of a sacrificial anvil 1001 is shown. The sacrificial anvil 1001 comprises of a base portion 1005 and a channel 1003. As described above, a sacrificial material can be disposed within the channel 1003. Furthermore, it is contemplated that the composition of base portion 1005 can be the same as, or different than, the composition of the sacrificial material. In some embodiments, the composition of the sacrificial material is a metal alloy. In other aspects of some embodiments, the composition of the sacrificial material can be substantially similar to a composition of at least one of a first and second workpieces.

The mechanical characteristics of the anvil (e.g., the base portion and the sacrificial material) can be configured and selected to provide the necessary characteristics for forming a FSW weldment. For example, the hardness value of the sacrificial material could be selected so that it is within 10%, 5%, or even 2%, of the hardness value of the first. In addition, the base portion can have a shape that matches the contours of the backside of the junction and a composition that provides structural support when the FSW pin penetrates the junction of the workpieces.

In other aspects of some embodiments, the anvil can be coupled with a hydraulic press in a manner that provides additional force and support to the workpieces during the FSW process. When the sacrificial material of the anvil is positioned against the backside of the junction of workpieces, the force of the hydraulic press can be sufficiently large to press sacrificial material into the junction. In this manner, when lack of penetration (LOP) occurs during the FSW process due to variations in workpiece thickness or force variability in the FSW tool, the sacrificial material helps to create a stronger seam at the LOP areas.

Figure 10A:
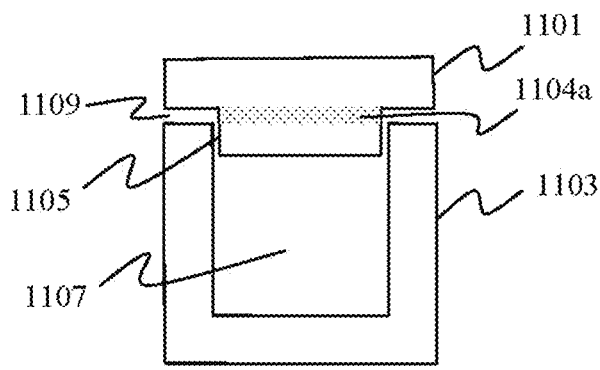
FIGS. 10A-C are cross sectional views of various embodiments of a lid having an anvil portion with a sacrificial material disposed therein. The sacrificial material is used to form a weld that seals the lid to a container via a FSW process.
Figure 10B:
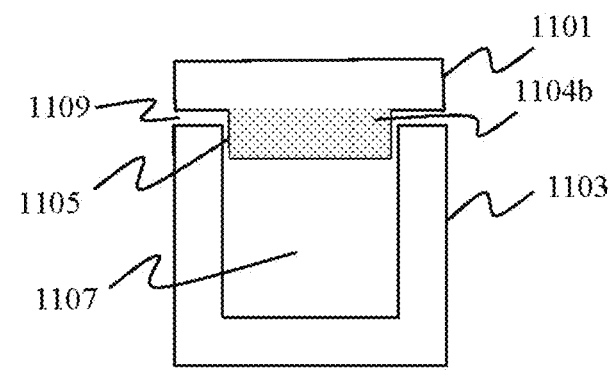
Figure 10C:
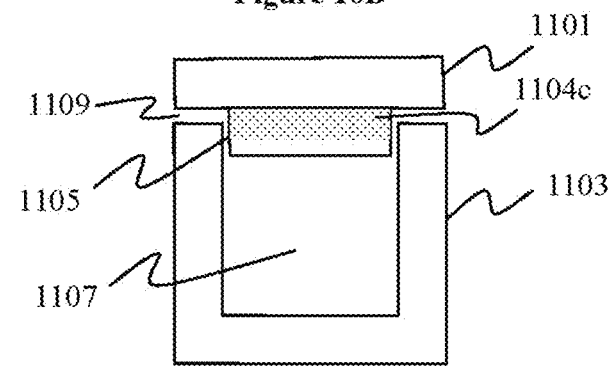

In FIGS. 10A-C, another aspect of the inventive subject matter comprises a first workpiece 1101 and a second 1103 workpiece that can be welded using friction stir welding. In this embodiment, a portion of the first workpiece 1101 serves as an anvil 1105 and has a sacrificial material 1104. First 1101 workpiece is a lid and the second 1103 workpiece is a container to be sealed. In such embodiments, a material (e.g., radioactive waste) can be enclosed within the lumen 1107 of the second 1103 workpiece. Anvil 1105 is the portion of first workpiece 1101 that fits inside second workpiece 1103 and provides support to the backside of junction 1109.

As described above, it is contemplated that anvil 1105 can include a ridge or channel, wherein the sacrificial material is disposed within the ridge or channel. The changes in composition with respect to the ridge/channel can vary as previously discussed. The size and area of sacrificial material 1104 can vary, depending on the application, as illustrated by sacrificial materials 1104a, 1104b, and 1104c, in FIGS. 10A-10C, respectively.

It should be appreciated that upon welding the first and second workpieces 1101 and 1103, anvil 1105 remains within lumen 1107.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A friction stir welding machine comprising:
a rotatable pin; and
a sacrificial anvil wherein the sacrificial anvil comprises:
   a base portion having a base composition, wherein the base portion has a channel;
   a sacrificial material disposed in the channel; and
   wherein the sacrificial material has a compositional change from a first composition to the base.

2. The anvil of claim 1, wherein the sacrificial material comprises a metal.

3. The anvil of claim 1, wherein the sacrificial material has a composition that is substantially similar to a composition of at least one of the first and second workpieces.

4. The anvil of claim 1, the anvil comprises a first curved surface that is complementary to a second curved surface of a junction between a first workpiece and a second workpiece.

5. The anvil of claim 4, wherein the anvil has thermal conductivity that is within 10% of a thermal conductivity of the first workpiece.

6. The anvil of claim 4, wherein the anvil has a thermal capacity that is within 5% of a thermal capacity of the first workpiece.

7. The anvil of claim 1, wherein the sacrificial material is integrally formed with the base portion.

* * * * *